US009154748B2

(12) United States Patent
Hsu et al.

(10) Patent No.: US 9,154,748 B2
(45) Date of Patent: Oct. 6, 2015

(54) ONLINE EXAMINATION PROCTORING SYSTEM

(71) Applicants: Board of Trustees of Michigan State University, East Lansing, MI (US); Stephen Hsu, Okemos, MI (US)

(72) Inventors: Stephen Hsu, Okemos, MI (US); Xiaoming Liu, Okemos, MI (US); Xiangyang Alexander Liu, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 321 days.

(21) Appl. No.: 13/775,363

(22) Filed: Feb. 25, 2013

(65) Prior Publication Data
US 2014/0240507 A1    Aug. 28, 2014

(51) Int. Cl.
| H04N 7/18 | (2006.01) |
| G06Q 10/00 | (2012.01) |
| G06Q 10/10 | (2012.01) |
| G09B 5/00 | (2006.01) |
| G09B 7/00 | (2006.01) |
| G06Q 50/20 | (2012.01) |

(52) U.S. Cl.
CPC ............. H04N 7/185 (2013.01); G06Q 10/10 (2013.01); G09B 5/00 (2013.01); G09B 7/00 (2013.01); G06Q 50/205 (2013.01)

(58) Field of Classification Search
CPC ....... G06Q 10/10; G06Q 50/205; G09B 5/00; G09B 7/00

USPC .......................................................... 348/159
See application file for complete search history.

(56) References Cited

U.S. PATENT DOCUMENTS

| 2007/0048723 A1 | 3/2007 | Brewer et al. |
| 2009/0189981 A1 | 7/2009 | Siann et al. |
| 2013/0282446 A1* | 10/2013 | Dobell .......................... 705/7.42 |

FOREIGN PATENT DOCUMENTS

WO    WO-2011-041707 A1    4/2011

OTHER PUBLICATIONS

Notification of Transmittal of International Search Report and Written Opinion for PCT/US2014/017584 mailed Jul. 4, 2014, 10 pages.

* cited by examiner

*Primary Examiner* — Hee-Yong Kim
(74) *Attorney, Agent, or Firm* — Harness, Dickey & Pierce, P.L.C.

(57) ABSTRACT

The system to proctor an examination includes a first camera worn by the examination taking subject and directed to capture images in subject's field of vision. A second camera is positioned to record an image of the subject's face during the examination. A microphone captures sounds within the room, which are analyzed to detect speech utterances. The computer system is programmed to store captured images from said first camera. The computer is also programmed to issue prompting events instructing the subject to look in a direction specified by the computer at event intervals not disclosed to subject in advance and to index for analysis the captured images in association with indicia corresponding to the prompting events.

53 Claims, 4 Drawing Sheets

ONLINE EXAMINATION PROCTORING SYSTEM

FIELD

The present disclosure relates generally to systems for administering and proctoring examinations. More particularly the disclosure relates to a system for proctoring examinations that facilitates the administration of online education, and government or professional certification or accreditation programs, where the participant is tested without the need for a human proctor to be present to ensure against cheating.

BACKGROUND

This section provides background information related to the present disclosure which is not necessarily prior art.

Online education offers the potential to greatly expand the reach of today's educational institutions, both by providing a wider range of educational resources to enrolled students and by making educational resources available through adult education programs to persons who are not formally enrolled in a college or university.

Testing is an important and necessary component of any educational program, and online educational programs are no exception. The mechanics of testing the student's knowledge become problematic with online programs because, with no human proctor present, there is no reliable way to ensure against cheating. When tests are administered in a controlled and proctored environment, such as in a classroom, the students can be monitored by a human proctor during the test. However, in online programs there may be no convenient way to provide the human proctor.

The same is true in testing situations outside the educational environment. For example governmental examinations and professional certification examinations also currently require a human proctor to ensure against cheating. The need for a human proctor increases the cost of testing and often restricts the venues available where testing can be administered. Limitations imposed by cost and available venue may dictate that a test be administered only at limited times. This places a burden on the student and limits the frequency with which testing can be performed.

To illustrate, in a government program designed to assess the skills and aptitudes of an entire population, testing may be practical only at selected time intervals, such as for example, once a year, for students entering high school that year. If testing could be conducted in a more distributed and frequent fashion, it would be possible to obtain a more granular and accurate assessment of the skills and aptitudes of the student population. With such more granular and accurate assessment the educational process could be more finely controlled. Current cost and venue demands make this impractical.

SUMMARY

This section provides a general summary of the disclosure, and is not a comprehensive disclosure of its full scope or all of its features.

The disclosed technology offers a solution to the testing problem by providing a way to administer tests without the need for human proctors or real-time human supervision. The technology employs a first camera worn by the examination-taking or test-taking subject. The camera is directed to capture images in subject's field of vision. The first camera may be mounted on eyeglasses or an ear piece or cap worn on the subjects head, for example. A computer system is then programmed to store captured images from the first camera.

In addition the computer system is programmed to issue prompting events instructing the subject to look in a direction specified by the computer, or to give a verbal response, such as having the subject state his or her name. These prompts are generated at event intervals that are not disclosed to subject in advance. The computer system is further programmed to index for analysis the captured images and audio responses in association with indicia corresponding to the prompting events. The computer system indexes images captured from the first camera, and any captured audio, with the prompting events, to allow rapid lookup and retrieval of images and audio captured at and around the time of the prompting event.

Thus, for example the computer system may prompt the subject, at unpredictable instances, to look under the subject's desk, for example, or to perform a 360 degree visual sweep of the room where the subject is seated, or to scan the surface of the subject's desk. The first camera, worn by the subject, will thus record and store whatever happens to be in the field of view when the prompting instruction is given. If there is any evidence of cheating, such will be captured, indexed and stored. Because the prompts and specific nature of the instructions given are not known by the subject in advance, it is virtually impossible for the subject to anticipate and take countermeasures to avoid being caught cheating.

By similarly prompting the subject to give a verbal response, the computer system can capture audio such as utterances by the subject. In addition the computer can capture other ambient sounds within the test environment, including sounds produced by the computer system or by the test computer. In this regard, computer generated announcements may provide an audio feed indicating the test time remaining. Capturing these ambient sounds would allow detection, for example, of a confederate whispering answers to the examination-taking or test-taking subject.

In addition, the disclosed technology may also employ a second camera, positioned to capture an image of the at least the face of the subject and preferably the face and upper body of the subject. The computer system likewise captures data from the second camera and indexes it with the images captured from the first camera. Correlation of the images from the respective first and second cameras provides additional information on whether the subject is attempting to cheat. Capturing an image of the subject's face and upper body serves as a strong deterrent against employing an alias to take the test on behalf of the registered subject. Face authentication processing may be performed on the captured image to verify that the subject taking the test is, in fact, the registered subject and not an impostor.

Moreover, the computer system can display a predefined image on a display screen of the computer system and then issue a prompting event to have the subject look at the screen. The first camera captures an image of what is seen on the display screen while the second camera simultaneously captures an image of the subject's face and upper body. These may be linked together by common index, representing a record of the subject's identity together with data displayed on the screen showing computer system generated information reflecting the state of the proctoring system, such as the time of day, version of proctoring system software running, identity of test being administered, and the like.

If desired the computer system may also be programmed to perform pattern recognition upon the images captured in response to prompting events, as a way of flagging events that contain potential evidence of cheating.

Thus the system to proctor an examination can continuously (1) authenticate that the right person is taking the examination and (2) monitor the subject's behavior to prevent and/or deter cheating. Random interaction with the subject provides a powerful deterrent against cheating, as the subject cannot plan in advance to circumvent the monitoring measures taken by the system.

The data captured by the computer system may be stored indefinitely in a networked computer system, allowing interested parties with authorization to inspect the saved images later to assess whether any of the indexed events contain evidence of cheating. The threat of having these captured images available for later inspection, such as in conjunction with a job interview, serves as an additional deterrent against cheating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
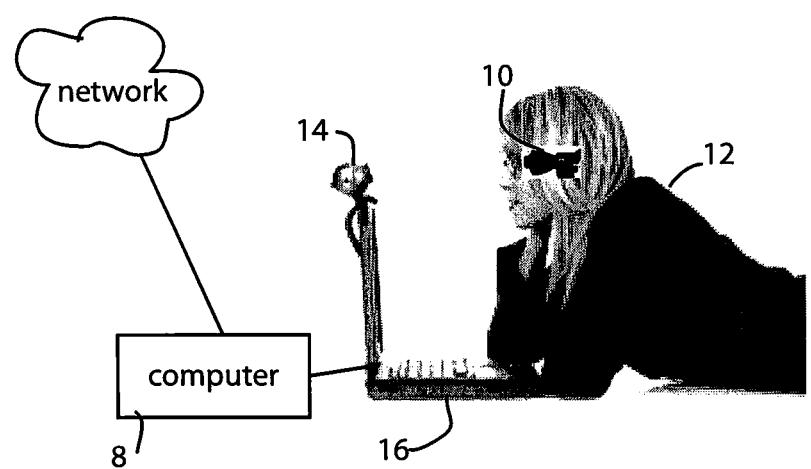
FIG. 1 is a system diagram giving an overview of a computer-implemented system to proctor an examination.

Some of the basic components of a system to proctor an examination are shown in FIG. 1. The basic implementation employs a computer or networked computer system 8 that gathers and stores image data, such as still frame image or video data, and optionally audio data. These data are obtained while the test or examination is being administered. Image data are obtained from a first camera 10 that captures the scene in the subject's field of view. The first camera 10 may comprise a video camera that is adapted to be worn by the examination-taking subject 12. In this regard, a suitable camera is available from Taser International, Inc., for example, using the Axon Flex camera. Image data are also optionally obtained from a second camera 14 trained on the face and upper body of the subject 12. Camera 14 may be embedded in the display screen of a computer used to administer the test. The computer system 8 issues prompts to the test or examination-taking subject, at times unpredictable by the subject, and then records and indexes the image and audio data captured as the subject responds to the prompts. By way of example the subject might be prompted to look under the desk, and the computer system would capture via the first camera 10 what the subject sees under the desk, while watching the subject's movements with the second camera 14. Other comparable instructions may include having the subject look behind and around the subject's computer, which would spot an extra video-out connection or signal splitter that would allow confederates outside the room to see the test questions.

In a typical application the subject is taking a test or examination that is being administered by a computer, such as computer device 16. Computer device 16 can be separate from computer system 8, or their respective functions may be combined in a single computer device. Thus, although not required, the computer device 16 can serve the dual purposes of (a) administering the examination and (b) proctoring the examination as explained herein. However, the system to proctor an examination will also work with tests and examinations administered through other means, such as paper-printed tests and examinations. In on-line education applications it is anticipated that quizzes, tests and examinations may be delivered from on-line resources accessed via the Internet. In FIG. 1 computer device 16 has been illustrated as a laptop computer, however it will be appreciated that other computer device form factors are also possible, including tablet computers. The same is true for computer 8.

Figure 2:
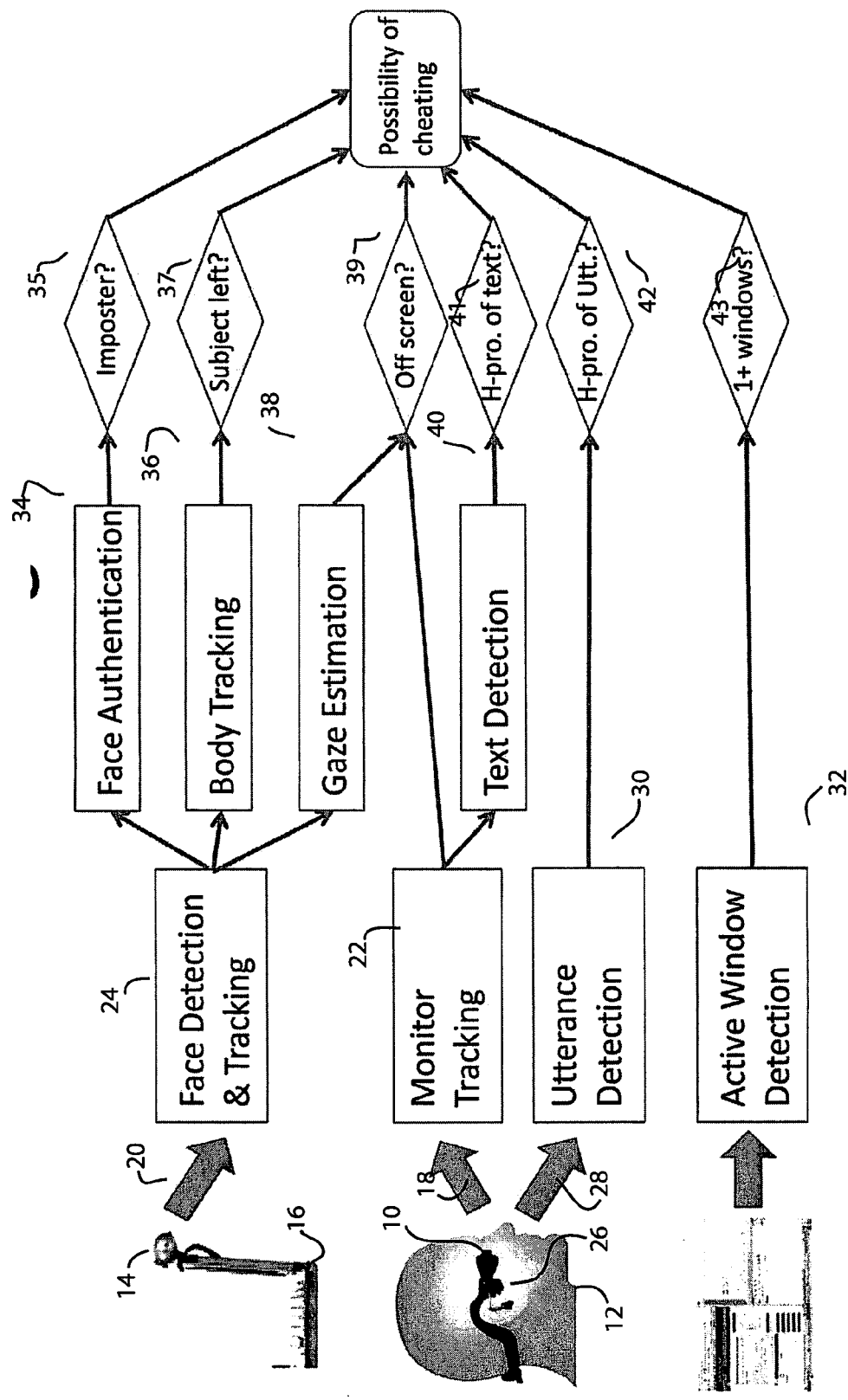
FIG. 2 is a system diagram depicting some of the computer processing components of a computer-implemented system to proctor an examination.

In one embodiment, shown in FIG. 2, the computer-implemented system employs a first camera 10, such as a video camera, that is adapted to be worn by the examination taking subject 12. As discussed above, first camera 10 can be attached to a pair of glasses worn by the subject, or attached to an ear-mounted strap or head-mounted cap, or pinned to the collar or lapel of the subject's clothing, for example. In one embodiment, the system further includes a second camera 14 positioned to capture an image of the face and upper body of the subject. As discussed above, the second camera can be a video camera mounted to or incorporated into the computer device 16 being used to administer the test. In FIG. 2, the computer device has not been specifically illustrated, although it will be understood that the computer processor functions illustrated in FIG. 2 are performed by computer 8 (FIG. 1) or by the computer device 16 (FIG. 1).

FIG. 2 more specifically shows some of the automated tracking and analysis functions that are performed by the computer system. Video data captured by the first camera 10 and by the second camera 14 are fed as data 18 and 20 to the computer-implemented monitor tracking system 22 and the computer-implemented face detection and tracking system 24. As indicated above, these detection and tracking systems may be implemented by programming computer 8 (shown in FIG. 1), as will be more fully discussed below. Alternatively, these detection and tracking functions can be implemented by the computer device 16, the computer being used to administer the test. Alternatively, these functions can be implemented by a server computer with which the computer device 16 communicates, as over a local area network and/or the Internet. Executable code to perform these detection and tracking functions can be downloaded from servers, via the Internet, and installed on computer 8 or computer device 16 prior to administering the test. If desired some of the functions can be performed by capturing data via computer 8 or computer device 16 and offloading the subsequent processing functions to a network-connected server.

In addition to the visual monitoring and tracking functions, the system to proctor an examination may also include one or more audio input devices, such as microphone 26, which may be integrated into the first camera as a subassembly. Audio data from the microphone are supplied as at 28 to an utterance detection system 30, which is also computer-implemented. As with the detection and tracking functions, the utterance detection function may also be implemented either on computer 8, computer device 16, and/or on a server with which the computer 8 or computer device 16 communicates. As explained above, the computational burden can be handled by a single computer alone, or distributed across several computers or servers.

In addition to receiving and processing visual and audio sensor data, the system further includes an active window detection system 32 that captures information sufficient to identify the active window being displayed on the computer device 16, and to optionally also identify of other windows that may be visible yet not currently active. This information may be captured by a number of different techniques ranging from performing a screen capture of the data in the video RAM or video buffer of the computer device 16 or by obtaining window identification information from the computer operating system or from the test application running on the operating system.

All of the data collected by these systems are used to collectively assess whether there is a possibility of cheating taking place at any given time. The face detection and tracking system 24 performs several functions to assess the possibility of cheating. For example, to detect whether an impostor is taking the test on behalf of the registered subject, the face detection and tracking system 24 includes a face authentication processor 34 that uses a computer-implemented facial authentication algorithm to compare the face of the test taker with a previously stored image of the registered subject. In one embodiment, the facial authentication is performed using a trained model of the registered subject against which the detected video image is compared according to a plurality of predefined model parameters. The facial authentication algorithm performs a stochastic process or computational process to generate a probability score that the test taker is the registered subject. This score is tested at 35 to determine if the test taker is an impostor.

In addition to face detection, the tracking system 24 also performs body tracking as at 36 in order to answer the simple question of whether the subject has stepped away from the examination-taking or test-taking site. Stepping away from the examination or test-taking site at unapproved times also represent a possibility of cheating.

Further, the face detection system 24 also performs specific analysis of the subject's gaze, by monitoring the direction of gaze of the subject's eyes, as depicted at 38. During the test, it is expected that the subject will focus his or her eyes on the computer device screen where the test is displayed or, perhaps, on the keyboard of the computer device. Frequent gazing in other directions could also represent a possibility of cheating.

The data from first camera 10, supplied to the monitor tracking system 22, provides additional information regarding the possibility of cheating. During the test taking, it is expected that the subject will be viewing the text of the test being displayed on the computer device 16. However, if the subject is instead looking elsewhere at textual notes, the computer-implemented system analyzes the text captured by camera 10 and compares it with the text being displayed on the computer device screen. This is shown at 40. Optical character recognition may form part of the test detection process, to allow the test displayed on the screen to be compared with optically-captured text from the first camera 10. If the respective texts do not match to a high probability level, the possibility of cheating is present. Thus, for example, if the subject were to look down at handwritten or printed notes brought to the test, the text detection system 40 will detect this as soon as the subject looks at the notes.

The utterance detection system 30 monitors the sounds picked up by microphone 26 to detect if speech utterances are present. During an examination or test, it is normally expected that no one will be speaking in the room, unless the test itself utilizes speech, in which case the nature of content of that speech is known by the system. Of course, during the test there could be extraneous noises caused by the test taker shifting in his or her seat or caused by outside street noise, which would not be necessarily indicative of cheating. Thus, the system is specifically configured to detect speech utterances and discriminate those from extraneous noise and also from speech that is known to be part of the examination or test. If utterances are detected which to a high probability should not be occurring, the system detects this at 42 and such detection also constitutes the possibility of cheating. Detection of speech utterances may be performed using a trained model with speech recognizer designed to recognize continuous speech. By comparing the output of the recognizer against a dictionary of words, the system can detect if speech is present, and even generate a word-searchable, text-based output reflecting what was said. Alternatively speech utterances may be detected by other means such as by utilizing signal processing to extract parameters known to exist in speech and then using trained models or other artificial intelligence techniques to identify if the sounds correlate strongly to human speech.

Finally, the active window detection system 32 can also function as an indication of the possibility of cheating. For example, if the text being displayed on the computer device 16 comprises a known window with known text, and if an additional window is also displayed on the computer screen (which is not expected or part of the test), the presence of this extraneous window could likewise indicate the possibility of cheating. Thus, for example, if the subject opens an Internet web browser while taking the test in order to look up an answer to one of the questions of the test, this would be instantly detected by the active window detection system 32.

Figure 3:
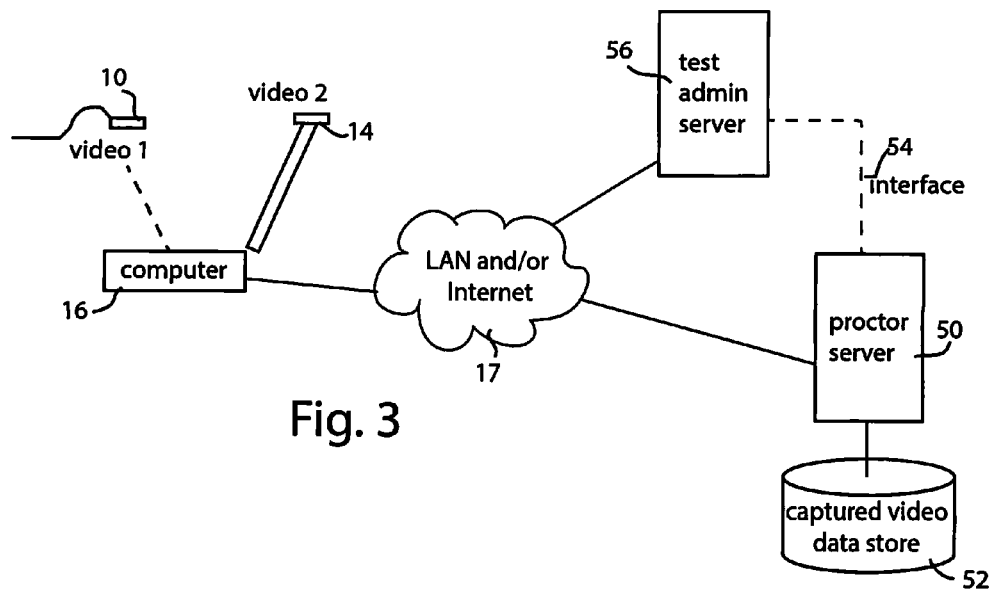
FIG. 3 is a networked computer system diagram showing yet another embodiment of the computer-implemented system to proctor an examination.

As previously noted, the system to proctor an examination can be implemented on the computer device 16 being used to administer the test, by a server computer with which the computer device communicates, or in a distributed fashion by a combination of the computer device and one or more servers. To further illustrate this, FIG. 3 depicts computer 16 that is in communication over a local area network and/or the Internet 17 to a proctor server 50. Computer 16, in this case, includes a built-in camera in the display that serves as the second camera 14 of the system. Computer 16 also wirelessly communicates with a head-mounted video camera 10. Although not shown, the microphone 26 (FIG. 2) may also communicate via a wireless link with computer 16. A suitable wireless technology for this purpose may be based on Wi-Fi and/or Bluetooth technology. While a wireless arrangement is often most convenient, a wired connection with camera 10 and microphone 26 is also possible.

The proctor server 50 includes a data store or database 52 into which captured video and other metadata collected by the system are stored. The data stored on captured video store 52 may be made available to third parties, such as by connection through the local area network and/or Internet 17, either concurrently with the test being administered or afterwards. If desired, the data store 52 can be maintained indefinitely, allowing a subject's test taking honesty to be examined at a later date if necessary.

In some applications the test being administered will, itself, be supplied by a server. To illustrate this, test administration server 56 is shown in communication with computer 16 via the local area network and/or Internet 17. This distributed architecture offers considerable flexibility. For example, the test being administered via the test administration server 56 can be maintained and controlled by an entirely different party from the party who maintains and controls the proctor server 50. For example, the test administration server 56 might be controlled by a university or government testing agency; whereas the proctor server might be controlled by an examination validation service provider, which only captures data indicative of the test subject's honesty, but otherwise has no other information regarding the nature of the test questions asked or the answers given. Indeed, the examination validation service which controls the proctor server 50 would not need to know any vital information or confidential information about the test subject, other than an identification number sufficient to identify the subject at a later date so that his or her data could be retrieved.

The distributed nature of the architecture shown in FIG. 3 also allows various functional components of the system to be deployed on different computer devices, to suit the needs of a particular system. With reference back to FIG. 2, the face detection and tracking, monitoring tracking, utterance detection and active window detection systems may be implemented entirely on computer device 16, or entirely on proctor server 50, or in some combination thereof where both computer 16 and proctor server 50 share responsibilities. The decision on which functions to allocate to the computer device 16 and which functions to allocate to proctor server 50 will depend, on part, on the speed and bandwidth of the local area network and/or Internet 17, and also on the degree to which the computer device 16 can be locked down to prevent tampering. If a high-speed, high-bandwidth network connection is available, computer device 16 may only need to perform the basic functions of communicating with the cameras, microphone and active window detection system, and the data gathered from these devices would then be sent to the proctor server 50 for processing. When less bandwidth is available, the computer device 16 may be programmed to perform some of the pre-processing steps locally before the harvested data are sent to server 50. These pre-processing steps may include, for example, data compression of the video and/or audio data streams.

The distributed architecture that allows the proctoring function to be separated from the assessment function need not be apparent to the subject. The examination-taking or test-taking subject's computer can communicate simultaneously with the proctor server 50 as well as the server that provides the assessment (test) content, such as test administration server 56. The browser application or web technology employed by the subject's computer can naturally integrate these to data sources so that they appear as unified functionality. A web page, for example can be configured to present information from two different servers simultaneously. In this case the proctoring functions and the assessment (testing) functions can be thus integrated into a single presentation.

Figure 4:
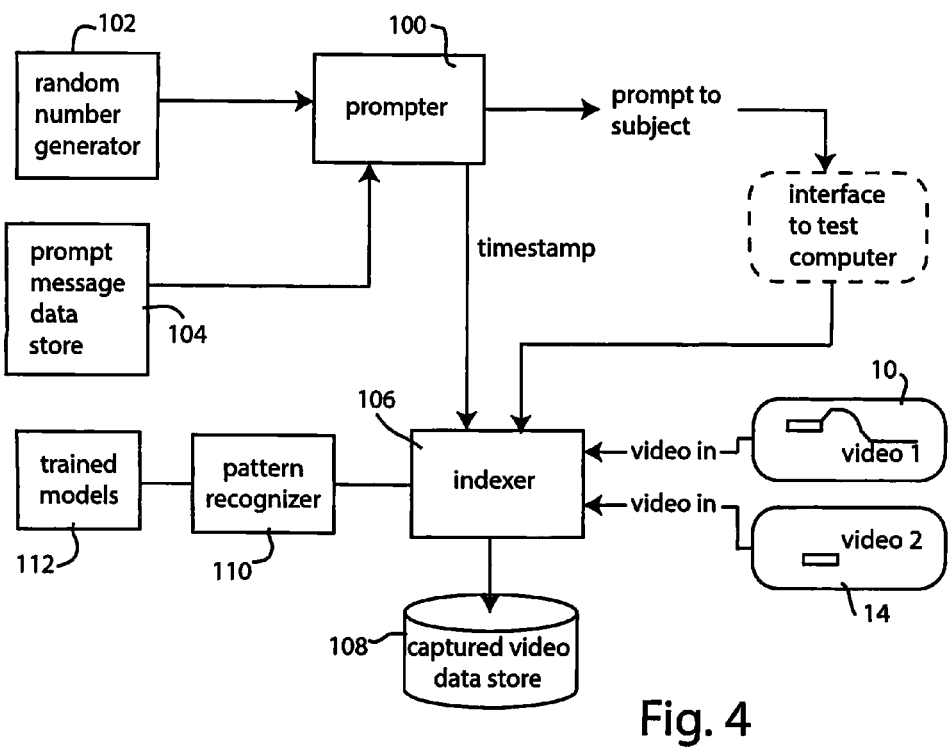
FIG. 4 is a detailed block diagram depicting the processing components of the computer-implemented system to proctor an examination.

With the understanding that the functionality of the system may be distributed among several computers, refer now to FIG. 4 which shows in greater detail how these computer systems are programmed. One component of the system is the prompter processor 100. The purpose of prompter 100 is to prompt the subject at unpredictable times to turn and look in a designated direction, so that camera 10 can capture what is seen by the subject after responding to the prompt. The idea is to request the subject at unpredictable times to look in a direction not known to the subject in advance. Not knowing when the prompt will occur or where the subject will be directed to look forms a strong psychological deterrent against cheating because there is an ever-present chance that the cheating will be discovered on camera and stored for future reference, potentially forever.

The prompter processor, which may be implemented using the processor of computer device 16 and/or proctor server 50 employs a random number generator 102 that issues prompt event signals at random or pseudo-random times, causing the prompter to pull or read a prompt message from a prompt message data store 104 stored in computer memory, either locally in computer device 16 or in proctor server 50. The prompt message is then sent to the display screen of computer device 16 and/or played as a speech message through a speaker or headphones within audible range of the subject. The prompt message instructs the subject to look in a particular direction or at a particular location. For example, the prompt message might instruct the subject to look under his or her desk, or to look at the display monitor of computer device 16, or look at some other location, all being unknown to the subject prior to receiving the prompt message.

Meanwhile, data feeds from the first and second cameras 10 and 14 are fed to the indexer processor 106, which stores or buffers the incoming images in memory administered by the indexer processor. The indexer processor, like the prompter processor 100, may be implemented using the processor of computer device 16, proctor server 50, or both. When the prompter processor 100 issues a prompt to the subject, it also issues a command to the indexer processor, causing the indexer to associate a time stamp demarcating a video frame or image at or near the time when the prompt was issued. This time stamp thus marks the beginning of a series of video frames or still images (depending on the type of camera used) showing what the subject sees in his or her field of vision in carrying out the prompting instructions. In addition, the data feed from camera 14 provides images of the subject's face during this same time frame. These time stamps are then associated with the respective images to correlate those images with a particular prompting event. The time stamps are stored as metadata by the indexer processor as will be more fully discussed in connection with FIG. 5.

In addition to capturing data from the cameras, the indexer processor 106 also has an interface to the computer device 16, allowing the indexer to capture information about what is being displayed on the display of the computer device 16 at the time the prompt is issued. This data is also stored as metadata by the indexer processor.

The indexer processor mediates the storage of these captured metadata along with the captured images, such as captured video images from the two cameras. The indexer processor stores or buffers the captured video data in a data store 108. This data store can be implemented using the same components used to implement data store 52 (FIG. 3), or it can be a separate data store that retains a copy of the captured video data, image data, audio data and metadata until such time as that data can be loaded through the proctor server 50 into the captured video data store 52 (FIG. 3).

In one embodiment, the indexer processor is responsible for indexing and storing metadata associated with captured images (and audio information) so that the captured information can be retrieved and reviewed at a later date by human test validation personnel. If desired, the reviewing function can be performed by multiple persons (such as multiple students in the same class). Thus, if desired each student could be required to proctor and evaluate the recorded data for two or three other students. Such students would have the natural incentive to spot cheating, and of having each examination-taking or test-taking record reviewed by multiple random proctors prevents collusion. A voting method can be used to spot bad evaluations of the record. In a further embodiment, multiple person review can be crowd sourced, through a process that involves outsourcing tasks to a distributed group of people. This process can occur both online and offline. If desired such crowdsourcing can involve outsourcing to an undefined public rather than a specific body.

In an alternate embodiment, featured in FIG. 3, the system further includes artificial intelligence pattern recognizer 110 that has a set of trained models 112 designed to examine the data captured from the cameras and audio system in response to a prompting event, to analyze the data to see if there are any recognized patterns indicative of the possibility of cheating. The pattern recognizer essentially compares the incoming data with a set of trained models, each representing a different possible cheating scenario. The recognizer associates with each of the models a probability score indicating whether the current data being reviewed corresponds to each of the trained models. A cumulative probability score is then assigned to the prompting event, based on the individual probability scores of each of the trained model scenarios. The pattern recognizer 110 supplies the cumulative recognizer probability score to the indexer 106. The indexer 106 examines this score and determines if it is above a predetermined threshold. If so, the indexer flags the prompted event record to indicate that a possible cheating event has occurred in connection with the prompt ID (at the corresponding date-time stamp).

Figure 5:
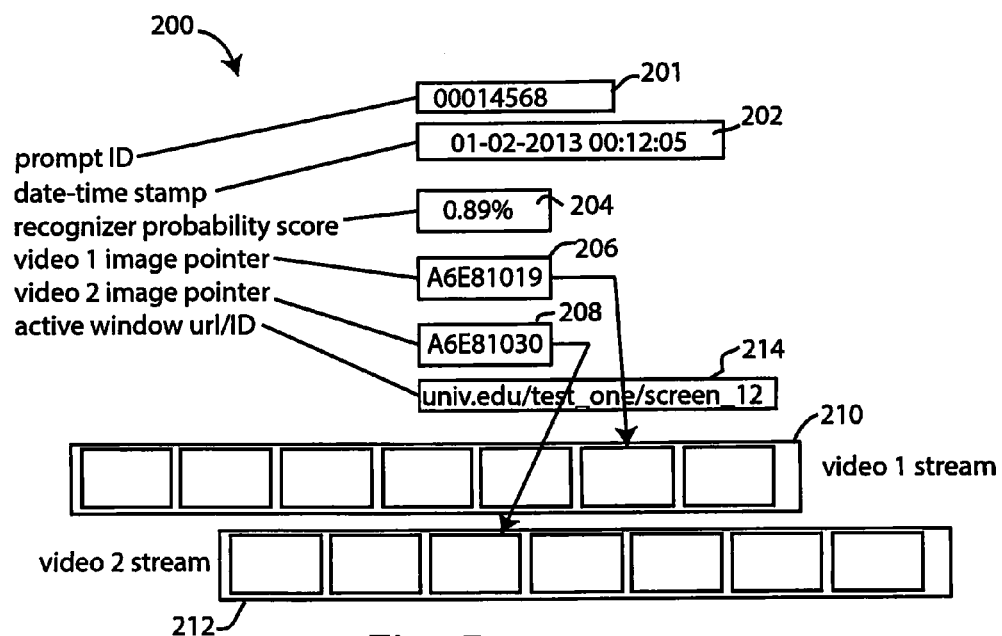
FIG. 5 is a data structure diagram useful in understanding how the computer-implemented system is programmed to store event data captured by the computer-implemented system to proctor an examination.

Referring now to FIG. 5, an exemplary data structure will now be discussed to explain the metadata stored by the system. As shown in FIG. 5, the memory associated with computer device 16, proctor server 50, or both, can be configured to store the metadata depicted at 200. These metadata include a record identifier key or prompt ID 201, corresponding to and identifying a single prompting event, a date-time stamp record 202, a recognizer probability score record 204, image pointers 206 and 208 to identify where in the respective video stream 210 and 212 the prompting event occurs. In addition, the metadata 200 also includes an active window URL or ID record 214, which stores the necessary information to precisely specify what screen (or screens) is visible on the display of computer device 16 at the time the prompt is given. Thus, for example, the active window URL/ID metadata might include information identifying the source of a particular test, the specific test, the page number or screen number of the test, and so forth. If multiple active windows are visible, or if windows are visible which are not currently active, these can also be represented at metadata using a format similar to that shown at 214.

The exemplary metadata data structure 200 thus represents one record corresponding to a single prompting event identified by a record identifier key or prompt ID 201. There will be one metadata 200 for each prompt issued by the system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system to proctor an examination, comprising:
first camera worn by the examination taking subject and directed to capture images in subject's field of vision;
computer system programmed to store captured images from said first camera;
said computer programmed to issue prompting events instructing the subject to look in a direction specified by the computer at event intervals not disclosed to subject in advance,
said computer system being further programmed to index for analysis the captured images in association with indicia corresponding to the prompting events.

2. The system of claim 1 wherein the indicia are timestamps corresponding to times when the prompting events were issued.

3. The system of claim 1 wherein the computer system further includes third party interface supporting retrieval and display of said captured images.

4. The system of claim 1 wherein the computer system includes an image storage server receptive of said stored images and providing third party interface supporting retrieval and display of said captured images.

5. The system of claim 1 wherein said storage server includes an archival data store into which said captured images are stored.

6. The system of claim 5 wherein said archival data store stores captured images in association with subject identifying information.

7. The system of claim 5 wherein said archival data store maintains record of said captured images without expiration.

8. The system of claim 1 wherein the computer system is further programmed to automatically analyze the captured images to detect abnormalities indicative of examination cheating by the subject.

9. The system of claim 1 wherein the computer system is further programmed to perform pattern recognition on the captured images to detect patterns indicative of examination cheating by the subject.

10. The system of claim 1 wherein the computer system is further programmed to automatically analyze the captured images to provide an alert message to an external system if evidence of examination cheating is detected.

11. The system of claim 1 wherein the computer system is further programmed to automatically analyze the captured images associated with the prompting events to detect abnormalities indicative of examination cheating by the subject.

12. The system of claim 1 wherein the computer system is further programmed to perform pattern recognition on the captured images associated with the prompting events to detect patterns indicative of examination cheating by the subject.

13. The system of claim 1 wherein the computer system is further programmed to automatically analyze the captured images associated with the prompting events to provide an alert message to an external system if evidence of examination cheating is detected.

14. The system of claim 1 wherein said computer system provides an interface to retrieve for analysis captured images associated with times when prompts were issued.

15. The system of claim 14 wherein the third party interface provides said information in substantially real time as the examination is being taken by the subject.

16. The system of claim 14 wherein the third party interface provides said information after the examination has been completed by the subject.

17. The system of claim 14 wherein the third party interface supports duplicate review by plural human reviewers.

18. The system of claim 1 wherein said examination is administered by an examination computer and wherein said system to proctor an examination further comprises an application program interface that couples said examination computer with the computer system of said system to proctor an examination.

19. The system of claim 1 further comprising a microphone coupled to said computer system and wherein said computer system is programmed to store captured audio information taken while the examination is being administered.

20. The system of claim 19 wherein said computer system is further programmed to store said captured images and captured audio information in long-term storage and said computer system provides an interface allowing evaluators to review said stored captured images and stored captured audio information in long-term storage at a date substantially after the date on which the subject took the examination during which the images and audio were captured by the first camera and microphone.

21. The system of claim 1 wherein said examination is administered by an examination computer having a display; and
wherein the computer system of the system to proctor an examination is programmed to cause a predetermined image to be displayed on the display of the examination computer.

22. The system of claim 21 wherein the predetermined image is the image of a clock face that displays a time of day that is synchronized to the indicia corresponding to the prompting events.

23. The system of claim 1 wherein said computer system is further programmed to store said captured images in long-term storage and said computer system provides an interface allowing evaluators to review said stored captured images in long-term storage at a date substantially after the date on which the subject took the examination during which the images were captured by the first camera.

24. A system to proctor an examination, comprising:
first camera worn by the examination taking subject and directed to capture images in subject's field of vision;
a second camera positioned to capture an image of at least the face of the subject;
computer system programmed to store captured images from said first and second cameras;
said computer programmed to issue prompting events instructing the subject to look in a direction specified by the computer at event intervals not disclosed to subject in advance,
said computer system being further programmed to index for analysis the captured images from said first and second cameras in association with indicia corresponding to the prompting events.

25. The system of claim 24 wherein the indicia are timestamps corresponding to times when the prompting events were issued.

26. The system of claim 25 wherein the computer system further includes third party interface supporting retrieval and display of said captured images.

27. The system of claim 25 wherein the computer system includes an image storage server receptive of said stored images and providing third party interface supporting retrieval and display of said captured images.

28. The system of claim 25 wherein said storage server includes an archival data store into which said captured images are stored.

29. The system of claim 28 wherein said archival data store stores captured images in association with subject identifying information.

30. The system of claim 29 wherein said archival data store maintains record of said captured images without expiration.

31. The system of claim 25 wherein the computer system is further programmed to automatically analyze the captured images to detect abnormalities indicative of examination cheating by the subject.

32. The system of claim 25 wherein the computer system is further programmed to perform pattern recognition on the captured images to detect patterns indicative of examination cheating by the subject.

33. The system of claim 25 wherein the computer system is further programmed to automatically analyze the captured images to provide an alert message to an external system if evidence of examination cheating is detected.

34. The system of claim 25 wherein the computer system is further programmed to automatically analyze the captured images associated with the prompting events to detect abnormalities indicative of examination cheating by the subject.

35. The system of claim 25 wherein the computer system is further programmed to perform pattern recognition on the captured images associated with the prompting events to detect patterns indicative of examination cheating by the subject.

36. The system of claim 25 wherein the computer system is further programmed to automatically analyze the captured images associated with the prompting events to provide an alert message to an external system if evidence of examination cheating is detected.

37. The system of claim 25 wherein said computer system provides an interface to retrieve for analysis captured images associated with times when prompts were issued.

38. The system of claim 26 wherein the third party interface provides said information in substantially real time as the examination is being taken by the subject.

39. The system of claim 38 wherein the third party interface provides said information after the examination has been completed by the subject.

40. The system of claim 38 wherein the third party interface supports duplicate review by plural human reviewers.

41. The system of claim 25 wherein said examination is administered by an examination computer and wherein said system to proctor an examination further comprises an application program interface that couples said examination computer with the computer system of said system to proctor an examination.

42. The system of claim 25 further comprising a microphone coupled to said computer system and wherein said computer system is programmed to store captured audio information taken while the examination is being administered.

43. The system of claim 25 wherein said examination is administered by an examination computer having a display; and
wherein the computer system of the system to proctor an examination is programmed to cause a predetermined image to be displayed on the display of the examination computer.

44. The system of claim 43 wherein the predetermined image is the image of a clock face that displays a time of day that is synchronized to the indicia corresponding to the prompting events.

45. The system of claim 24 wherein said computer system is further programmed to store said captured images from said first and second cameras in long-term storage and said computer system provides an interface allowing evaluators to review said stored captured images in long-term storage at a date substantially after the date on which the subject took the examination during which the images were captured by the first and second cameras.

46. The system of claim 24 wherein the second camera captures an image of the upper body of the subject.

47. A method of proctoring an examination comprising:
    using an examination subject-worn camera to capture images at least partially within the subject's field of vision;
    using a computer system to store the captured images; and
    using the computer system to issue prompting events instructing the subject to look in a direction specified by the computer at event intervals not disclosed to the subject in advance.

48. The method of claim 47 further comprising using the computer system to associate the captured images with the prompting events.

49. The method of claim 47 further comprising using a microphone to capture sounds audible in proximity to the subject and using the computer system to associate said captured sounds with the prompting events.

50. The method of claim 47 further comprising using a second camera to capture images of the subject and using the computer system to store the captured images of the subject.

51. The method of claim 50 further comprising using the computer system to issue prompting events to the subject to perform a specified action at intervals not disclosed to the subject in advance and using the computer system to associate the captured images of the subject with the prompting events.

52. The method of claim 47 further comprising using the computer system to analyze the captured images to detect abnormalities indicative of examination cheating by the subject.

53. The method of claim 47 further comprising using the computer system to perform pattern recognition on the captured images to detect abnormalities indicative of examination cheating by the subject.

* * * * *